US008629373B2

(12) United States Patent
Kaufman et al.

(10) Patent No.: US 8,629,373 B2
(45) Date of Patent: Jan. 14, 2014

(54) SYNCHRONIZED MULTIPLE DRIVE WIRE FEED WELDING SYSTEM AND METHOD

(75) Inventors: Charles L. Kaufman, Neenah, WI (US); Brandon J. Speilman, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1418 days.

(21) Appl. No.: 11/737,672

(22) Filed: Apr. 19, 2007

(65) Prior Publication Data

US 2008/0257874 A1 Oct. 23, 2008

(51) Int. Cl.
*B23K 9/10* (2006.01)
(52) U.S. Cl.
USPC ............... 219/137.71; 219/130.1; 219/137.7
(58) Field of Classification Search
USPC ............... 219/130.1, 137.71, 137.7
See application file for complete search history.

(56) References Cited

U.S. PATENT DOCUMENTS

| | | | | |
|---|---|---|---|---|
| 3,586,221 A * | 6/1971 | Rosen | ............... | 226/1 |
| 3,586,222 A * | 6/1971 | Rosen | ............... | 226/1 |
| 3,630,425 A * | 12/1971 | Wilkens | ............... | 226/108 |
| 3,657,511 A * | 4/1972 | Friedman et al. | ............ | 219/124.34 |
| 3,672,655 A * | 6/1972 | Carter | ............... | 226/108 |
| 4,309,642 A * | 1/1982 | Boden et al. | ............... | 318/113 |
| 5,935,458 A * | 8/1999 | Trapani et al. | ............ | 219/121.47 |
| 5,973,291 A * | 10/1999 | Kramer et al. | ............ | 219/130.01 |
| 6,903,305 B2 | 6/2005 | Mukai et al. | | |
| 7,301,124 B2 * | 11/2007 | Kaufman | ............ | 219/137.71 |
| 2006/0131293 A1 | 6/2006 | Kaufman | | |
| 2006/0157461 A1* | 7/2006 | Diekmann et al. | ............ | 219/137.71 |
| 2006/0207981 A1* | 9/2006 | Diekmann et al. | ............ | 219/137.2 |

FOREIGN PATENT DOCUMENTS

JP  55112176  8/1980

* cited by examiner

*Primary Examiner* — Henry Yuen
*Assistant Examiner* — Ayub Maye
(74) *Attorney, Agent, or Firm* — Fletcher Yoder P.C.

(57) ABSTRACT

A welding system, in certain embodiments, includes a synchronization controller configured to override a first nominal calibration of a first wire drive, or a second nominal calibration of a second wire drive, or both, in response to a tension condition or a compression condition of a welding wire feeding between the first and second wire drives. A welding system, in other embodiments, includes a welding wire drive having a motor, a controller, a nominal calibration, and a multi-drive synchronization parameter. The multi-drive synchronization parameter may be configured to control speed, or torque, or both, of multiple drives including the welding wire drive to facilitate synchronization of the multiple drives.

14 Claims, 7 Drawing Sheets

SYNCHRONIZED MULTIPLE DRIVE WIRE FEED WELDING SYSTEM AND METHOD

BACKGROUND

The invention relates generally to welding systems and, more specifically, to multiple drives in a wire feed welding system.

Welding systems sometimes include multiple wire drives to feed a welding wire to a torch. Unfortunately, the multiple wire drives are often out-of-synchronization, thereby causing compression or tension in the welding wire passing between the multiple wire drives. If the welding wire is in compression between the multiple wire drives, then the welding wire can buckle or coil like a spring. Unfortunately, the coiling of the wire can cause random directional changes in the wire feed trajectory, thereby making welding more difficult or impossible. If the columnar strength of the wire is exceeded while in compression, then the welding wire can buckle causing a wire jam and failure of the system. If the welding wire is in tension between the multiple wire drives, then the welding wire may become deformed due to compaction, stretching, or shaving. Again, the wire deformation can cause random directional changes in the wire feed trajectory, thereby making welding more difficult or impossible. Excessive tension in the welding wire can also cause drive roll slippage in each of the multiple wire drives, thereby causing inconsistencies in the amount of wire delivered to the welding arc. The wire tension can also cause failure of the welding wire drives, for example, due to excessive motor current and excessive wear of the gears and bearings. Unfortunately, these problems with tension and compression in the welding wire are currently addressed by replacing the welding wire drives or separately calibrating the drives, which is both costly and time consuming. In addition, these solutions may require special equipment to identify and resolve the problem.

BRIEF DESCRIPTION

A welding system, in certain embodiments, includes a synchronization controller configured to override a first nominal calibration of a first wire drive, or a second nominal calibration of a second wire drive, or both, in response to a tension condition or a compression condition of a welding wire feeding between the first and second wire drives. A welding system, in other embodiments, includes a welding wire drive having a motor, a controller, a nominal calibration, and a multi-drive synchronization parameter. The multi-drive synchronization parameter may be configured to control speed, or torque, or both, of multiple drives including the welding wire drive to facilitate synchronization of the multiple drives.

DRAWINGS

These and other features, aspects, and advantages of the present invention will become better understood when the following detailed description is read with reference to the accompanying drawings in which like characters represent like parts throughout the drawings, wherein.

Figure 1:
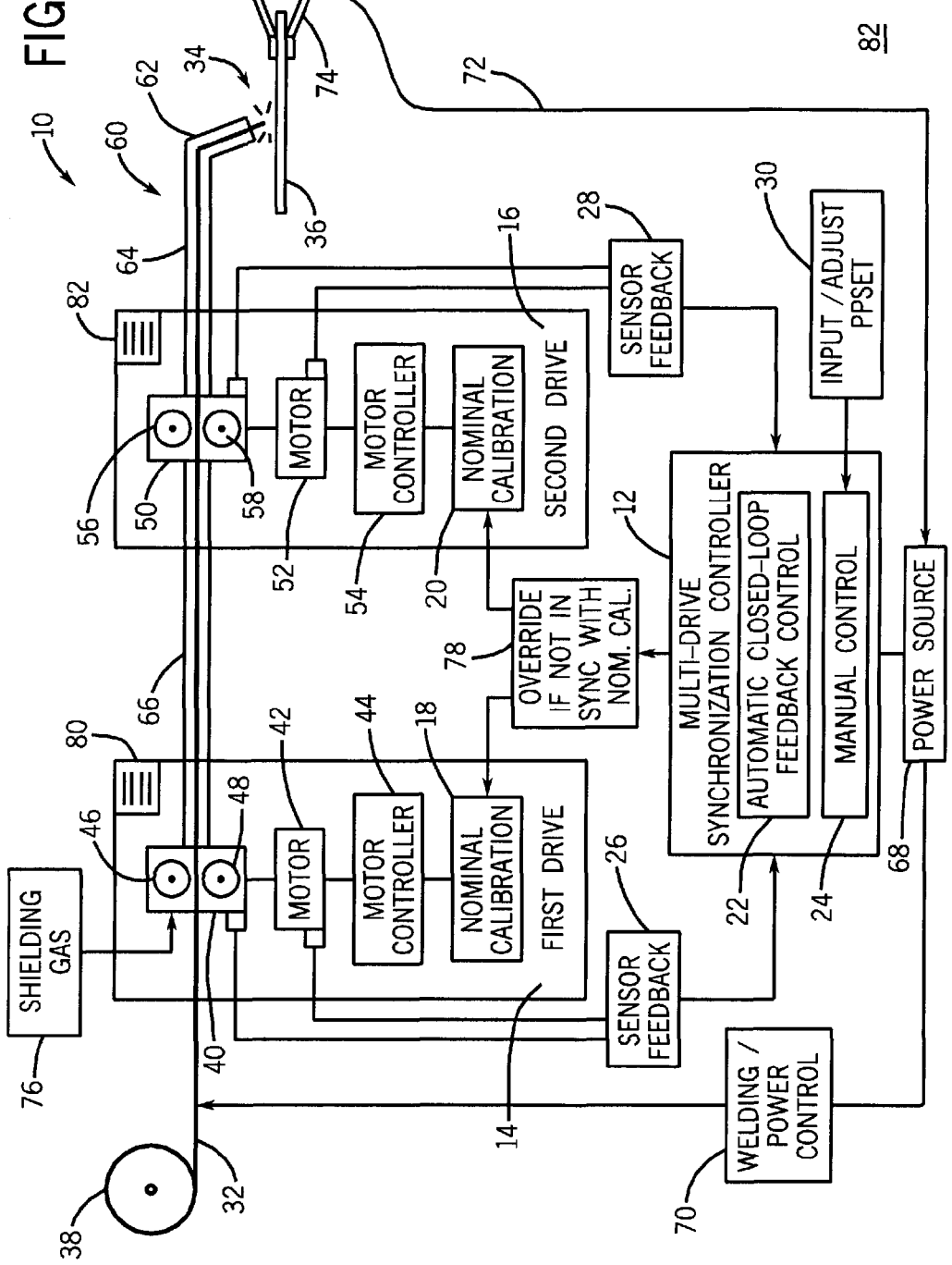
FIG. 1 is a block diagram of an embodiment of a multi-drive welding system having a multi-drive synchronization controller configured to override nominal calibrations of first and second drives if the drives are not in synchronization with one another using the nominal calibrations.
Figure 3:
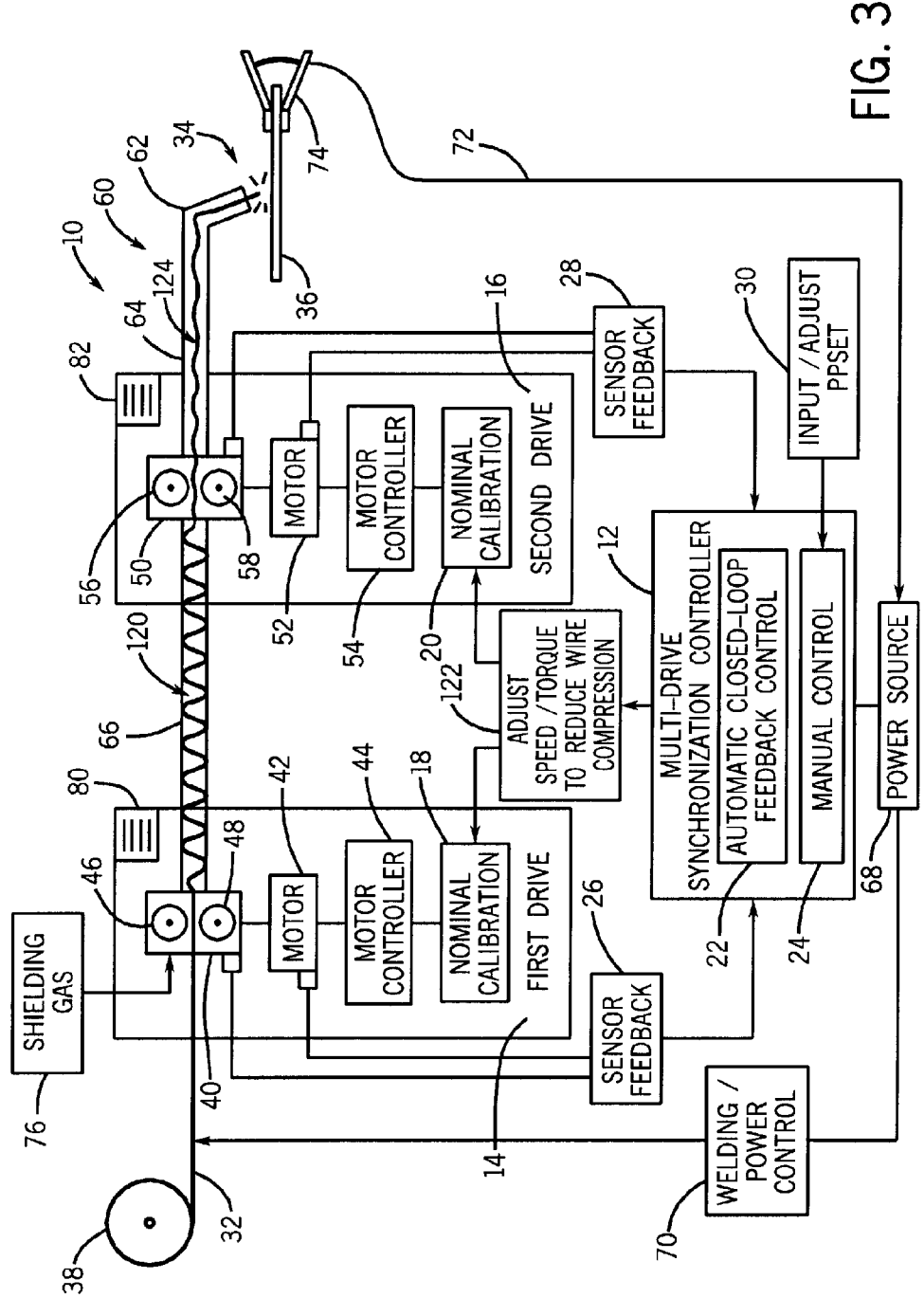
FIG. 3 is a block diagram of the multi-drive welding system as illustrated in FIG. 1, further illustrating a compression condition between the first and second drives and an adjustment in speed and/or torque to reduce the wire compression via the multi-drive synchronization controller.
Figure 4:
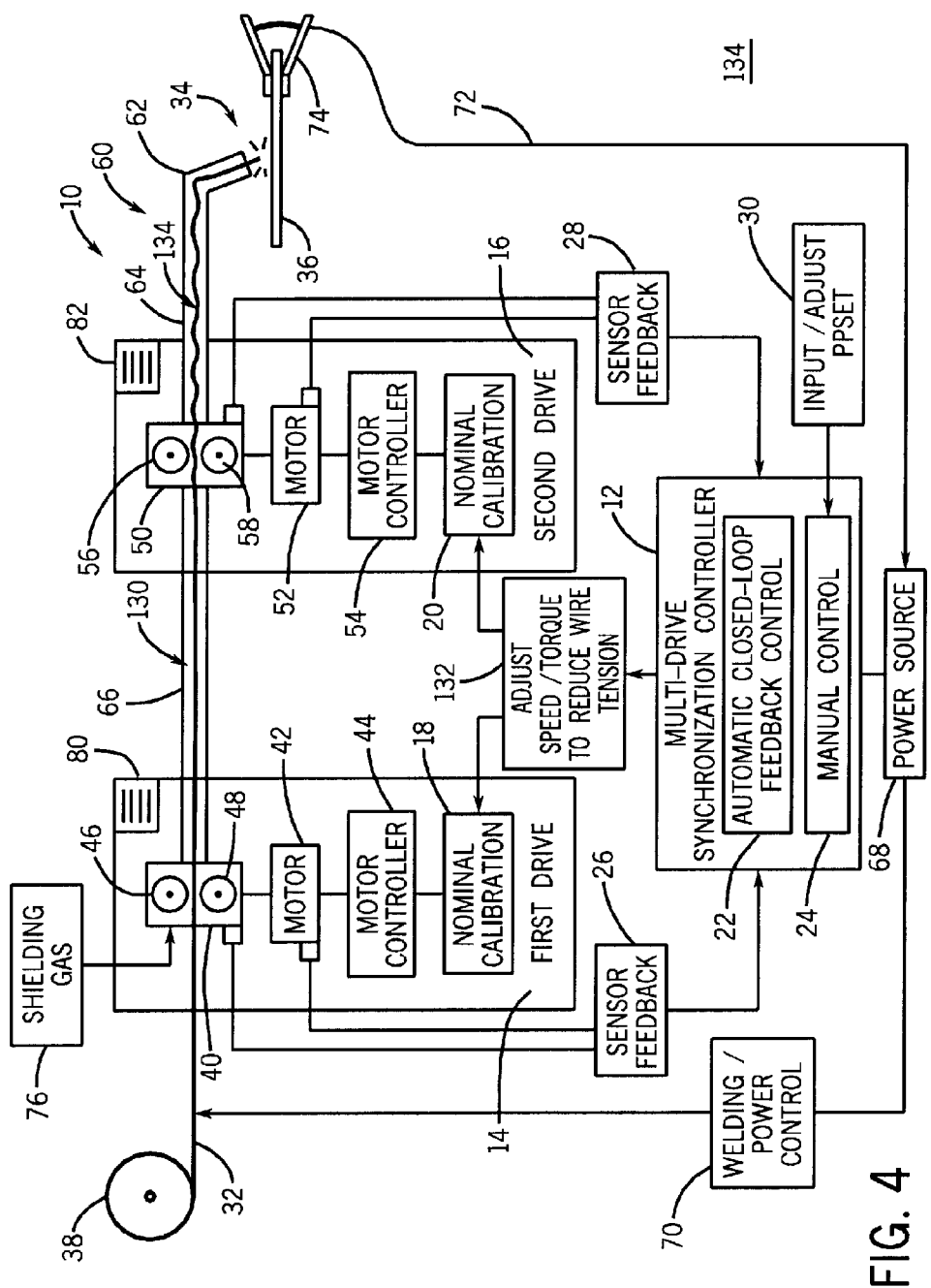
FIG. 4 is a block diagram of the multi-drive welding system as illustrated in FIG. 1, further illustrating a tension condition between the first and second drives and an adjustment in speed and/or torque to reduce the wire tension via the multi-drive synchronization controller.
Figure 5:
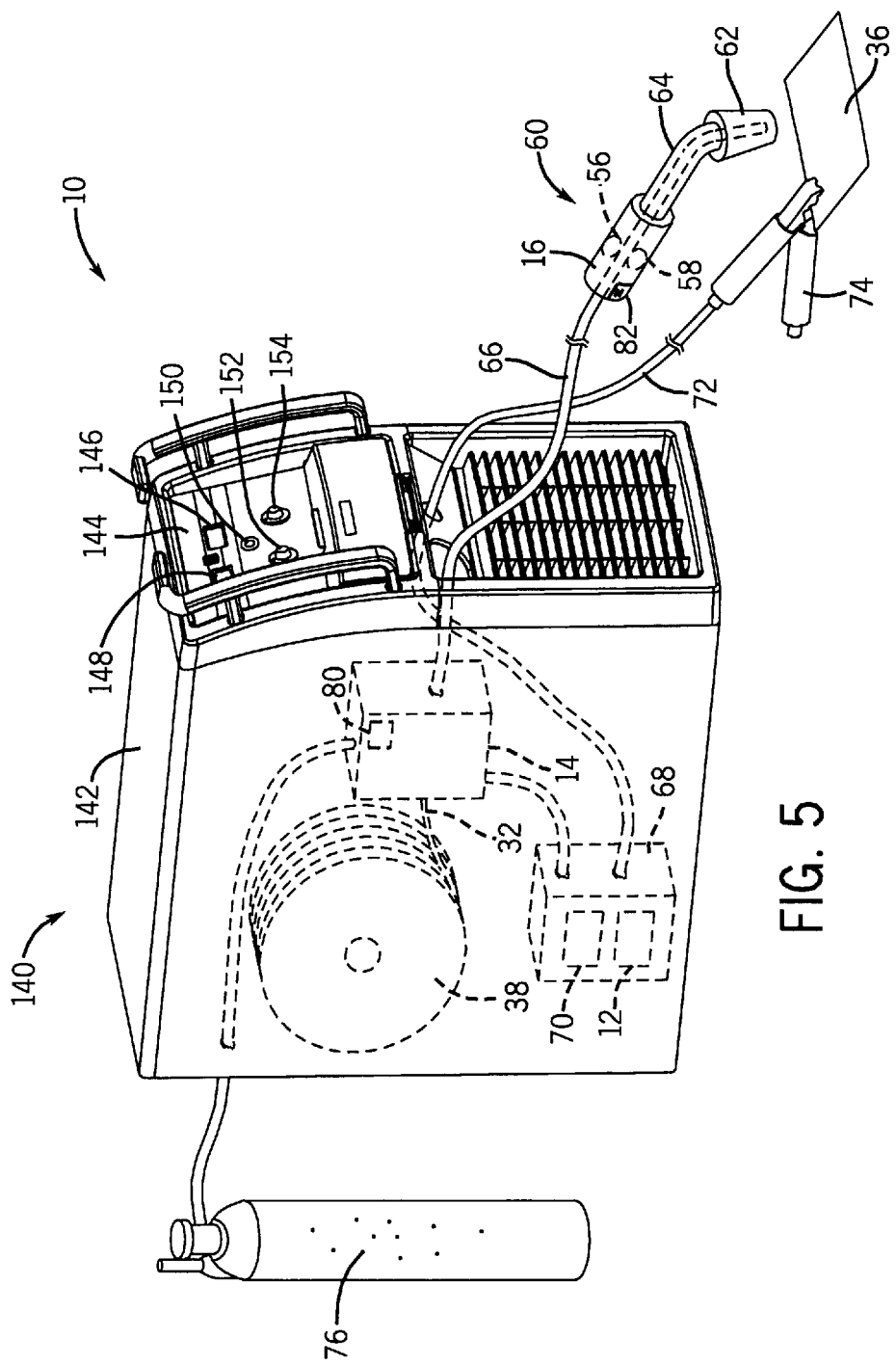
Figure 6:
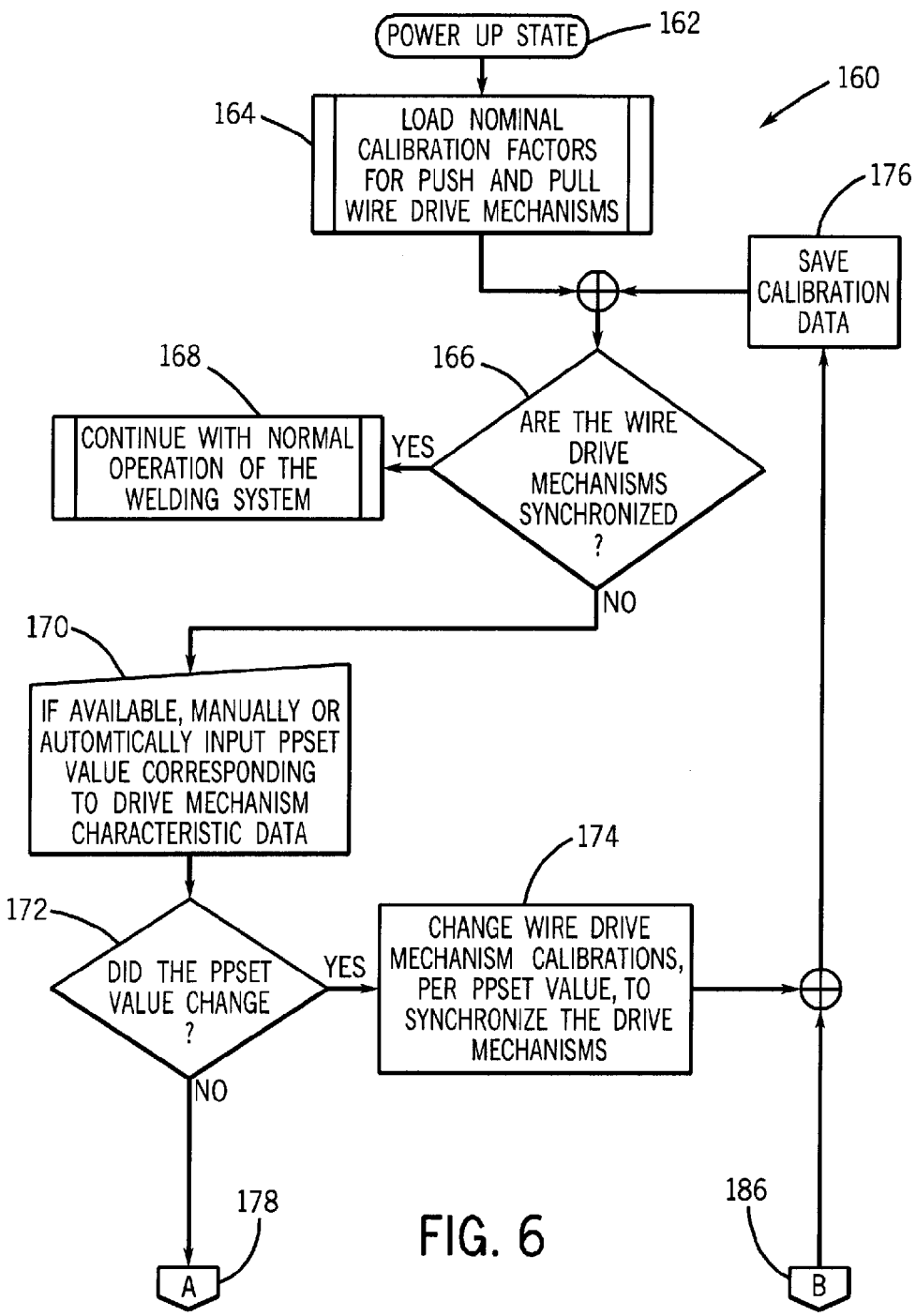
Figure 7:
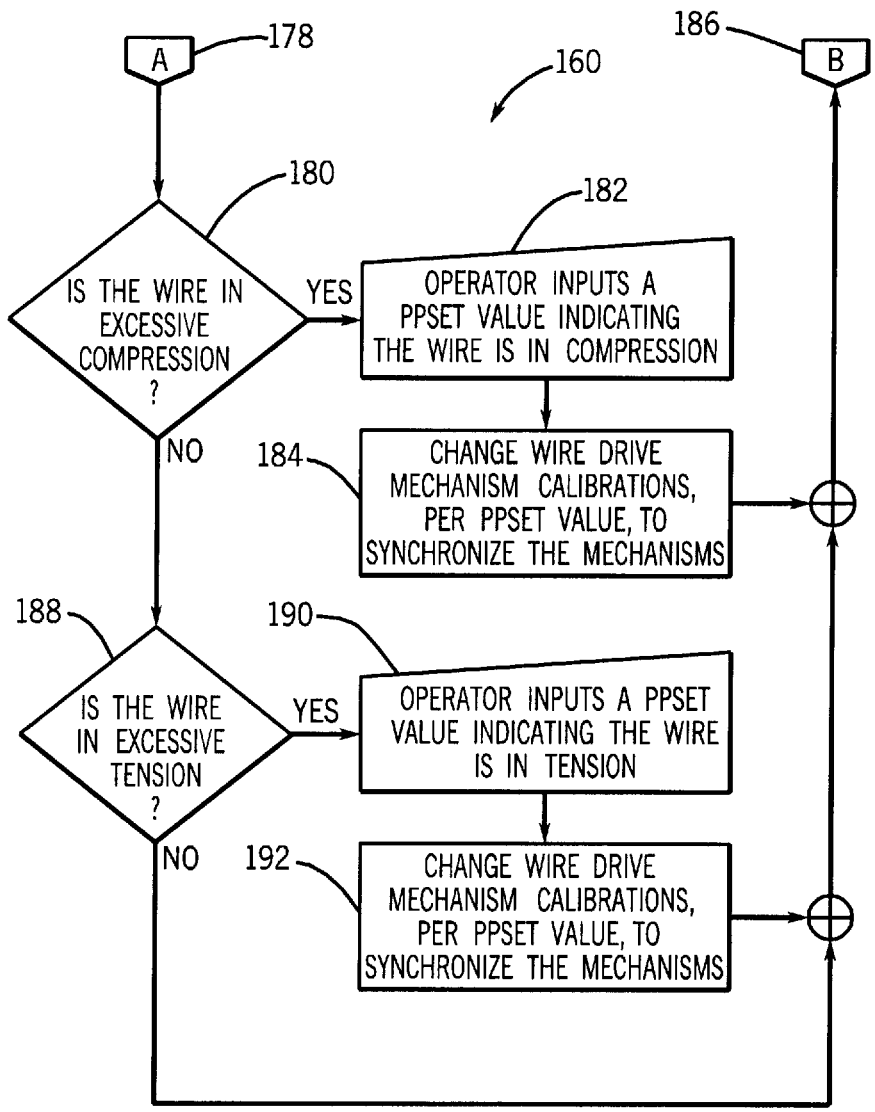

FIG. 5 is a perspective view of an exemplary embodiment of the multi-drive welding system as illustrated in FIGS. 1, 3, and 4, further illustrating a user control panel having one manual control configured to adjust a single control parameter capable of controlling speed and torque of both the first and second drives to synchronize the first and second drives with one another; and FIGS. 6 and 7 are flowcharts illustrating an exemplary embodiment of a process for synchronizing the first and second drives of FIGS. 1 and 3-5.

DETAILED DESCRIPTION

As discussed in detail below, the present embodiments relate to a unique and simple technique for synchronizing a plurality of welding wire drives in a welding system. Specifically, the multiple wire drives are used with nominal calibration data unless the drives are not in synchronization with one another. For example, if one or more of the wire drives is functioning outside of normal tolerance levels, then the present embodiments override the nominal calibration data of that particular drive to ensure synchronization with the other drive in the system. Thus, the out-of-sync drive is not discarded, replaced, or calibrated with special equipment.

Instead, in certain embodiments, a single control parameter may be used to control the speed, torque, and other parameters of all wire drives in the system, thereby ensuring synchronization of the drives with one another. For example, a user may increase, decrease, or generally input the control parameter via a keypad, a rotatable control knob, a sliding control, a control dial, a touch screen, or another suitable control. In each of these scenarios, the single control parameter is able to adjust and synchronize the operation of the multiple wire drives in the field without any special equipment. As a result, the user can quickly eliminate a tension condition or a compression condition of the welding wire between the multiple welding wire drives. Alternatively, the present embodiments may have a closed-loop control system, which is capable of automatically eliminating a compression condition or a tension condition in response to sensor feedback of wire speed, wire strain, motor current, motor voltage, or other sensed parameters.

FIG. 1 is a block diagram of an exemplary embodiment of a multi-drive welding system 10 having a multi-drive synchronization controller 12 configured to synchronize a plurality of welding wire drives, such as a first drive 14 and a second drive 16, if nominal calibration data 18 and 20 does not successfully maintain these drives 14 and 16 in synchronization with one another. In the illustrated embodiment, the controller 12 includes an automatic closed-loop feedback control 22 and a manual control 24. The controls 22 and 24 both may function to adjust the torque, speed, or other operational characteristics of the first drive 14, the second drive 16, or both, via a push-pull set (PPSET) parameter. In other words, the torque and/or speed (and possibly other parameters) may be a function of the PPSET parameter. For example, the PPSET parameter may be configured to vary both the torque and speed of both the first and second drives 14 and 16 if a tension or compression condition is sensed by the control 22 or visualized by a user.

The illustrated controller 12 is configured to receive a variety of sensor feedback 26 and 28 from various portions of the first and second drives 14 and 16. For example, the sensor feedback 26 and 28 may include motor speed, motor current, motor voltage, wire speed, wire strain, or a combination thereof. In addition, the sensor feedback 26 and 28 may be input into the feedback control 22, thereby enabling automatic control if the sensor feedback 26 and 28 indicates an out-of-sync condition between the first and second drives 14 and 16. For example, if the feedback 26 indicates a first wire feed speed of the first drive 14 that is substantially greater than a second wire feed speed of the second drive 16 as indicated by the feedback 28, then the controller 12 may automatically decrease the first wire feed speed and/or increase the second wire feed speed. Similarly, if the feedback 26 indicates that the first wire feed speed of the first drive 14 is substantially less than the second wire feed speed of the second drive 16 as indicated by the feedback 28, then the controller 12 may automatically increase the first wire feed speed and/or decrease the second wire feed speed. These adjustments may be achieved by simply increasing or decreasing the PPSET parameter.

In addition, the manual control 24 is configured to receive an input or adjustment of a control parameter 30, such as the PPSET parameter. Again, in certain embodiments, the parameter 30 may be a single control parameter capable of adjusting the speed, torque, or both, of the first drive 14, the second drive 16, or both, to facilitate synchronization of the first and second drives 14 and 16 with one another. In other words, the single parameter 30 may be increased or decreased to synchronize the entire multi-drive welding system 10 without complicated diagnostic equipment, without replacing one of the drives 14 or 16 having tolerances outside normally expected limits, and without extensive knowledge of the welding system 10. As a result, a user without any special knowledge can simply increase or decrease the parameter 30 to reduce or eliminate a compression condition or tension condition between the first and second drives 14 and 16.

The illustrated welding system 10 uses the first and second drives 14 and 16 in a series arrangement to feed a welding wire 32 to a welding arc location 34 at a work piece 36. Specifically, the first drive 14 receives the welding wire 32 from a wire spool 38, and the second drive 16 receives the welding wire 32 from the first drive 14. As illustrated, the first drive 14 includes a drive roll mechanism 40, a motor 42 coupled to the drive roll mechanism 40, a motor controller 44 coupled to the motor 42, and nominal calibration data 18 used by the motor controller 44 to operate the drive roll mechanism 40 within minimum and maximum tolerances. The illustrated drive roll mechanism 40 includes a first pair of drive rolls 46 and 48 disposed about the welding wire 32. Similarly, the second drive 16 includes a drive roll mechanism 50, a motor 52 coupled to the drive roll mechanism 50, a motor controller 54 coupled to the motor 52, and the nominal calibration data 20 used by the motor controller 54 to operate the drive roll mechanism 50 within the minimum and maximum tolerances of the motor 52. The illustrated drive roll mechanism 50 includes a second pair of drive rolls 56 and 58 disposed about the welding wire 32. In the present embodiment, the first drive 14 may be described as a push-drive mechanism, whereas the second drive 16 may be described as a pull-drive mechanism. These push and pull drive mechanisms 14 and 16 cooperate with one another to push and pull the welding wire 30 from the spool 38 to the welding arc location 34.

Eventually, the welding wire 32 passes through a welding torch 60, such as a metal inert gas (MIG) welding torch or a tungsten inert gas (TIG) welding torch. The torch 60 includes a head 62 coupled to a body or handle 64. For example, the head 62 may include a nozzle, a diffuser, a contact tip, and various other components of a typical welding torch 60. In addition, the second drive 16 may be coupled to the welding torch 60. For example, the welding torch 60 and the second drive 16 may be an integral unit, or the second drive 16 may be removable from the welding torch 60, or the second drive 16 may be a retrofit component configured to be adapted to the welding torch 60. In other embodiments, the second drive 16 may be disposed along a wire conduit 66 extending between the spool 38 and the welding arc location 34. In addition, the first drive 14 may be coupled to or disposed in a welding power unit having the synchronization controller 12, a power source 68, and a welding/power control 70.

In the illustrated embodiment, the power source 68 provides power to the controller 12 and the control 70, which in turn provides current to the welding wire 32 to create an arc at the welding arc location 34. Specifically, a welding circuit is formed by current passing from the power source 68, through the control 70, through the welding wire 32 being fed by the first and second drives 14 and 16, through the welding torch 60, and across a gap from the welding wire 32 to the work piece 36. A grounding cable 72 is coupled to the work piece 36 via a clamp 74, thereby completing the welding circuit back to the power source 68. In addition, a shielding gas 76 is coupled to the welding system 10 to supply a shielding gas to the welding arc location 34. In the illustrated embodiment, the shielding gas 76 is coupled to the first drive 14, thereby supplying the shielding gas through the wire conduit 66 to the welding torch 60, where the shielding gas ejects at the welding arc location 34 about the welding arc being formed between the welding wire 32 and the work piece 36. In this manner, the shielding gas 76 shields the molten weld from undesirable contamination.

In addition, as discussed above, the synchronization controller 12 is configured to ensure synchronization between the first and second drives 14 and 16 in the event that the nominal calibration data 18 and 20 is incapable of ensuring synchronization between the first and second drives 14 and 16. In other words, if the nominal calibration 18 and 20 successfully works to synchronize the first and second drives 14 and 16 with one another (e.g., acceptable levels of, or no, tension or compression), then the controller 12 may not override the nominal calibration data 18 and 20. However, if the sensor feedback 26 and 28 or visual inspection of the first and second drives 14 and 16 indicates an out-of-sync condition (e.g., substantial tension or compression), then one or both of the controls 22 and 24 may be used to override the nominal calibrations 18 and 20 as indicated by block 78. As illustrated, block 78 indicates an override if not in sync with the nominal calibration data 18 and 20. In other words, if the nominal calibration data 18 and 20 is unsuccessful to synchronize the drives 14 and 16, then the override signal or command 78 is triggered by the controller 12 to adjust speed, torque, or another parameter, or a combination thereof, to return the drives 14 and 16 to a synchronized relationship with one another. Again, the control 22 may automatically initiate this override control in response to the sensor speed back 26 and 28. Alternatively, a user may manually input or adjust the control parameter 30 via the manual control 34, thereby reducing or eliminating a tension or compression condition between the drives 14 and 16.

The illustrated drives 14 and 16 also include records 80 and 82 of the control parameter, e.g., PPSET 30, for the particular drive 14 or 16. For example, in some embodiments, the records 80 and 82 may include a single pre-defined value disposed on an adhesive backed label, an inscription, memory, or another user accessible or computer accessible medium. In this manner, the multi-drive welding system 10 can be quickly and easily configured with the appropriate control data for the first drive 14 or the second drive 16. For example, if the second drive 16 is part of the welding torch 60, which may be purchased or added on separately from the first drive 14, then the second drive 16 can be quickly calibrated for the overall welding system 10 via entry of the PPSET 30 value.

Figure 2:
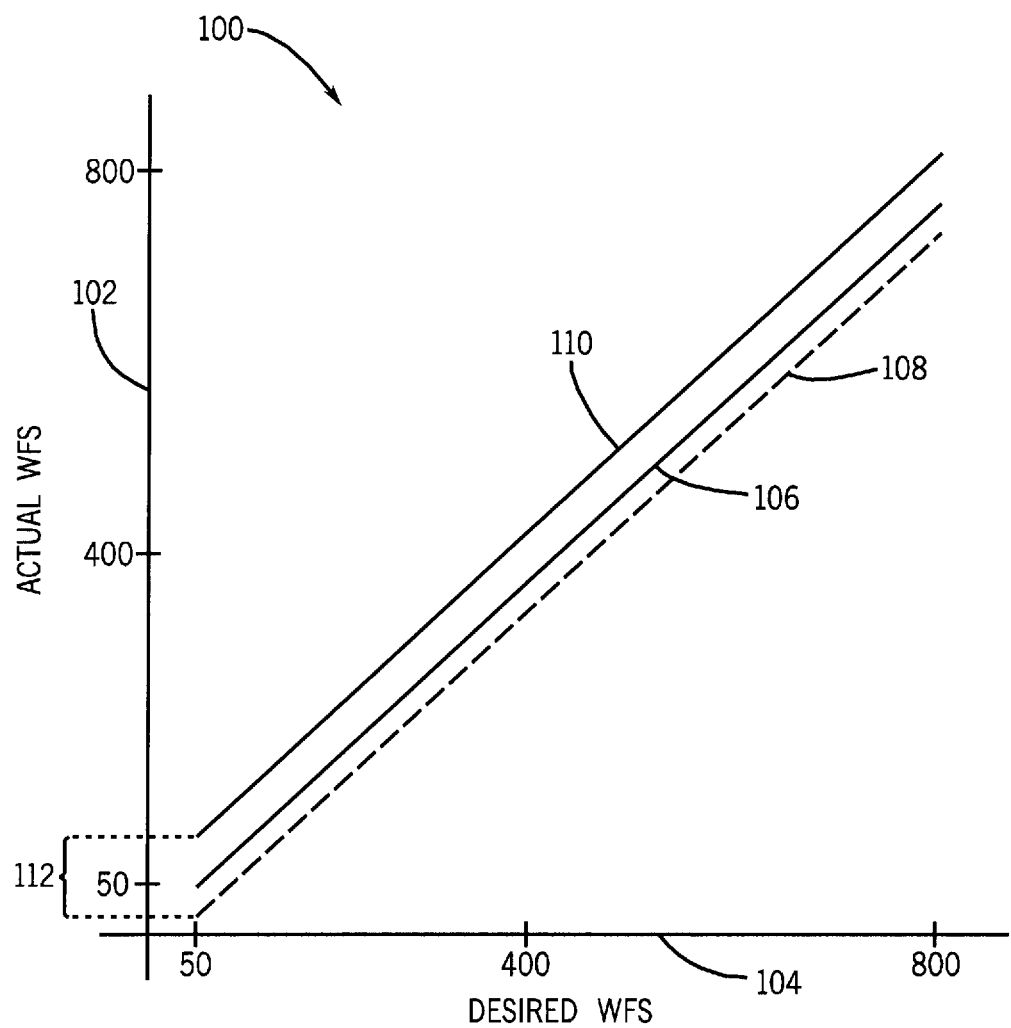
FIG. 2 is a graph of an actual wire feed speed (WFS) versus a desired wire feed speed (WFS) illustrating a nominal calibration between a minimum tolerance and a maximum tolerance for a welding wire drive.

FIG. 2 is a graph 100 of actual wire feed speed (WFS) 102 versus desired wire feed speed (WFS) 104 of an exemplary welding wire drive, illustrating a nominal calibration 106 between minimum and maximum tolerances 108 and 110 of a tolerance band 112 for the particular welding wire drive. In certain embodiments, a DC motor in a push drive mechanism may have a +/−15 percent speed tolerance specification and the nominal calibration for the wire drive may only operate effectively in a +/−7 percent window. A separate nominal calibration used for a pull drive could have a different DC motor with different acceptable operating and manufacturing tolerances. Although some of the push and pull drives may operate effectively with one another based on the nominal calibrations, some of these nominal calibrations may result in the push and pull drives being out-of-sync with one another. Thus, as discussed above with reference to FIG. 1, the synchronization controller 12 may then function to adjust various operational parameters to return the drives 14 and 16 to a synchronized condition by overriding the nominal calibration data 18 and 20.

FIG. 3 is a block diagram of the multi-drive welding system 10 as illustrated in FIG. 1, further illustrating a compression condition 120 of the welding wire 32 between the first and second drives 14 and 16 and an override 122 by the controller 12 to return the first and second drives 14 and 16 to a synchronized relationship. Specifically, as illustrated in FIG. 3, the welding wire 32 passing through the conduit 66 is zigzagging, coiled, or generally compressed between the drive roll mechanisms 40 and 50 due to a relatively lower speed of the drive roll mechanism 50 as compared with the drive roll mechanism 40. In other words, the drive roll mechanism 40 is pushing the welding wire 32 faster than the drive roll mechanism 50 is pulling the welding wire 32. As a result, the welding wire 32 is becoming compressed between the drive roll mechanisms 40 and 50, which can also cause deformation of the welding wire 32 as indicated by reference number 124.

In response to a visual indication or sensor feedback 26 and 28 indicative of the compression condition 120, the synchronization controller 12 may be operated automatically or manually via the controls 22 or 24 to adjust the speed and/or the torque of the first drive 14, the second drive 16, or both, to reduce the wire compression condition 120. For example, the feedback control 22 may respond to the sensor feedback 26 and 28 indicative of a greater speed or torque of the drive roll mechanism 50 relative to the drive roll mechanism 40. Alternatively, a user can input or adjust the control parameter 30 via the manual control 24, thereby implementing the adjustment in speed and/or torque 122 to override the nominal calibration data 18 and 20 of the first and second drives 14 and 16. Upon overriding the nominal calibration data 18 of the first drive 14, or the nominal calibration data 20 of the second drive 16, or both, the synchronization controller 12 may successively reduce or eliminate the compression condition 120 between the drive roll mechanisms 40 and 50. Again, the synchronization controller 12 may override the nominal calibration data 18 and 20 via a single control parameter, such as the PPSET parameter 30, via either the automatic control 22 or the manual control 24. Thus, the single parameter 30 is able to adjust multiple parameters (e.g., speed, torque, etc.) of multiple drives (e.g., drives 14 and 16).

FIG. 4 is a block diagram of the multi-drive welding system 10 as illustrated in FIG. 1, further illustrating a tension condition 130 between the first and second drives 14 and 16 and an override 132 by the synchronization controller 12 to return the first and second drives 14 and 16 to a synchronized relationship with one another. Specifically, in the illustrated embodiment, the drive roll mechanism 50 may be operating at a faster speed than the drive roll mechanism 40, thereby causing tension in the welding wire 32. In other words, the drive roll mechanism 40 may be pushing the welding wire 32 at a slower wire feed speed than the drive roll mechanism 50 is pulling the welding wire 32. As a result, the tension condition 130 between the drive roll mechanisms 40 and 50 can lead to deformation of the welding wire 32, e.g., stretching upstream and deformation downstream of the second drive 16 as indicated by reference number 134.

In response to a visual inspection or a comparison of the sensor feedback 26 and 28, the synchronization controller 12 may function to adjust the speed, the torque, or both, of the first and second drives 14 and 16 to reduce the wire tension condition 130 between the first and second drives 14 and 16. Specifically, the override 132 may increase the speed or torque of the first drive 14 relative to the second drive 16, thereby reducing or eliminating the differentials causing the tension condition 130 and the resulting deformation 134. In certain embodiments, the automatic control 22 responds to the feedback 26 and 28 to trigger the override 132 of the nominal calibration data 18 and 20 without user input. However, in some embodiments, a user may manually adjust or input the control parameter 30 via the manual control 34. For example, if a user visually inspects the welding system 10 and identifies the deformation 134, then the user may increase or decrease the control parameter 30 via the manual control 24. Again, as discussed above, a single control parameter, e.g., PPSET 30, may be increased or decreased to control various parameters (e.g., speed, torque, etc.) of the multiple drives (e.g., drives 14 and 16). As a result of the control provided by the synchronization controller 12, one or both of the drives 14 or 16 may have new calibration data to replace the nominal calibration data 18 or 20.

FIG. 5 is a perspective view of an exemplary embodiment of the multi-drive welding system 10 as illustrated in FIGS. 1, 3, and 4, further illustrating a welding power unit 140 having control features as discussed in detail above. The unit 140 includes various components disposed within a chassis 142 having a control panel 144, which is configured to enable user input of the control parameter 30 to the synchronization controller 12. Specifically, the illustrated unit 140 includes the synchronization controller 12 and the welding/power control 70 coupled to or integrated with the power source 68. In addition, the unit 140 includes the first drive 14 and the spool 38 within the chassis 142.

The control panel 144 includes displays 146 and 148 and user controls 150, 152, and 154. For example, the user controls 152 and 154 may be voltage and current controls configured to control the level of current and voltage being supplied to the welding wire 32. However, the user control 150 may be configured to enable adjustment of the control parameter 30 as discussed in detail above with reference to FIGS. 1, 3, and 4. For example, the user control 150 may be a knob that rotates clockwise and counter clockwise to increase and decrease the control parameter 30, thereby enabling the synchronization controller 12 to increase or decrease the speed, torque, or other parameters, or a combination thereof, of the first drive 14, the second drive 16, or both. In turn, the adjustment of the parameter 30 facilitates synchronization of the first and second drives 14 and 16 with one another. In addition, the displays 146 and 148 may display a voltage level, a current level, or a value of the control parameter 30. The control panel 144 also may have a keyboard or communication receptacle to enable user input via a keypad, a keyboard, a hand held device, or a combination thereof.

In the illustrated embodiment, the second drive 16 is coupled to the torch 60 along a rear portion of the handle 64. The torch 60 also includes the record 82 disposed along a portion of the drive 16. Again, the record 82 may be an inscription, an adhesive backed label, a barcode, an RFID tag, or another user readable or computer readable medium having the control parameter 30 for the drive 16. Thus, if the torch 60 is added onto the welding power unit 140 (e.g., aftermarket or replacement torch), then the user may input or set the control parameter 30 via the user control 150 according to the record 82. Alternatively, the synchronization controller 12 may automatically adjust the control parameter 30 to synchronize the first and second drives 14 and 16 with one another.

FIGS. 6 and 7 are flowcharts illustrating an exemplary embodiment of a process 160 for synchronizing multiple drives of a welding system, such as the multi-drive welding system 10 as illustrated and described with reference to FIGS. 1-5. In the illustrated embodiment, the process 160 may begin by entering a power up state 162 of the welding system 10. For example, the welding system 10 may power up the first and second drives 14 and 16 along with the synchronization controller 12. At this point, the process 160 may proceed to load nominal calibration factors for push and pull wire drive mechanisms (block 164). For example, the process 160 may load the nominal calibration data 18 and 20 for the first and second drives 14 and 16 for operation in push and pull configurations, respectively.

After loading the nominal calibration factors at block 164, the process 160 may proceed to determine whether the wire drive mechanisms are synchronized with one another at block 166. If the wire drive mechanisms are synchronized with one another at block 166, then the process 160 proceeds with normal operations of the welding system at block 168. In other words, if the first and second drives 14 and 16 are synchronized with one another based on the nominal calibration data 18 and 20, then the synchronization controller 12 will not override the nominal calibration data 18 and 20. Instead, the first and second drives 14 and 16 will operate solely based on the nominal calibration data 18 and 20. However, if the wire drive mechanisms are not synchronized with one another at block 166, then the process 160 proceeds to manually or automatically input a push-pull set (PPSET) value corresponding to drive mechanism characteristic data at block 170. For example, if the records 80 and 82 are user readable or computer readable at block 170, then the process 160 may automatically load the control parameters into the first and second drives 14 and 16 over the nominal calibration data 18 and 20. However, the records 80 and 82 may already be incorporated into the nominal calibration data 18 and 20. Therefore, block 170 may not result in any change to the PPSET value.

At block 172, the process 160 proceeds to evaluate whether or not the PPSET value has changed in response to block 170. If the PPSET value changed at block 172, then the process 160 proceeds to change the wire drive mechanism calibrations according to the PPSET value to synchronize the drive mechanisms with one another at block 174. In other words, the single PPSET value may cause a change in the speed, the torque, or both, of the first drive 14, the second drive 16, or both. The process 160 then saves the calibration data at block 176. At this point, the process 160 continues through the steps beginning at block 166. If the PPSET value does not change at block 172, then the process 160 may proceed to a supplemental process as indicated by block 178 which is the beginning of FIG. 7.

As illustrated in FIG. 7, the process 160 evaluates whether or not the wire is in excessive compression at block 180. If the wire is in excessive compression at block 180, then the process 160 may enable an operator to input a PPSET value indicating that the wire is in compression at block 182. In turn, the process 160 changes the wire drive mechanism calibrations according to the PPSET value to synchronize the mechanisms at block 184. Upon synchronizing the drive mechanisms, the process 160 proceeds to block 186, which continues in FIG. 6 to save the calibration data at block 176 and reiterates the steps beginning at block 166.

However, if the process 160 determines that the wire is not in excessive compression at block 180, then the process 160 queries whether or not the wire is in excessive tension at block 188. If the wire is in excessive tension at block 188, then the process 160 enables an operator to input a PPSET value indicating that the wire is in tension at block 190. In turn, the process 160 changes the wire drive mechanism calibrations according to the PPSET value to synchronize the drive mechanisms at block 192. Finally, the process 160 returns to block 186 in FIG. 6, which is followed by saving the calibration data at block 176 and continuing through the steps beginning at block 166. However, if the process 160 determines that the wire is not in excessive tension at block 188, then the process 160 returns to block 186 without changing the PPSET value.

In this exemplary embodiment of FIGS. 6 and 7, the operator is able to manually input a PPSET value to synchronize the drive mechanisms. In other embodiments, the forgoing steps of the process 160 may be performed automatically by the control 22 of the synchronization controller 12. In addition, the logic set forth in FIGS. 6 and 7 may be disposed on a tangible medium, such as a computer readable medium. For example, the computer readable medium may include a hard drive, a controller, a memory chip, an optical disk, a computer system, or a combination thereof.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A welding system, comprising:
   a synchronization controller configured to override a first nominal calibration of a first wire drive, or a second nominal calibration of a second wire drive, or both, in response to a tension condition or a compression condition of a welding wire feeding between the first and second wire drives.

2. The welding system of claim 1, wherein the synchronization controller is configured to reduce the tension condition or the compression condition in response to an adjustment of a single control parameter.

3. The welding system of claim 1, wherein the synchronization controller comprises a closed-loop control responsive to sensor feedback.

4. The welding system of claim 1, wherein the synchronization controller comprises a manual control having a single control parameter configured to reduce the tension condition or the compression condition.

5. The welding system of claim 1, comprising a welding power unit having the first wire drive and the synchronization controller, wherein the first wire drive is configured to receive the welding wire from a wire supply.

6. The welding system of claim 1, comprising a welding power source having the synchronization controller.

7. The welding system of claim 1, wherein the first nominal calibration, or the second nominal calibration, or both, are not specific to the welding system.

8. The welding system of claim 2, wherein both speed and torque of the first and second wire drives are a function of the single control parameter.

9. The welding system of claim 3, wherein the sensor feedback comprises speed, current, voltage, or a combination thereof, of the first wire drive, or the second wire drive, or both.

10. The welding system of claim 3, wherein the sensor feedback comprises wire strain of the welding wire feeding between the first and second wire drives.

11. The welding system of claim 5, comprising a welding torch having the second wire drive, wherein the second wire drive is configured to receive the welding wire from the first wire drive.

12. A method, comprising:
overriding nominal calibration data of a first welding wire drive, or a second welding wire drive, or both, to synchronize the first and second welding wire drives via a single control parameter if welding wire passing between the first and second welding wire drives is in an undesirable state of compression or tension.

13. The method of claim 12, wherein overriding nominal calibration data comprises controlling speed, or torque, or both, of the first welding wire drive, or the second welding wire drive, or both, via the single control parameter.

14. The method of claim 12, comprising operating the first and second welding wire drives with the nominal calibration data if the first and second welding wire drives are generally synchronized with one another.

* * * * *